United States Patent
Schüler et al.

(10) Patent No.: US 11,182,578 B2
(45) Date of Patent: Nov. 23, 2021

(54) DETERMINING A MODULE SIZE OF AN OPTICAL CODE

(71) Applicant: SICK AG, Waldkirch (DE)

(72) Inventors: Pascal Schüler, Waldkirch (DE);
Marcel Hampf, Waldkirch (DE);
Fredrik Olsson, Linköping (SE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 17/009,962

(22) Filed: Sep. 2, 2020

(65) Prior Publication Data
US 2021/0073499 A1 Mar. 11, 2021

(30) Foreign Application Priority Data
Sep. 5, 2019 (EP) ..................................... 19195509

(51) Int. Cl.
*G06K 7/10* (2006.01)
*G06K 7/14* (2006.01)

(52) U.S. Cl.
CPC ........... *G06K 7/1452* (2013.01); *G06K 7/146* (2013.01); *G06K 2007/10504* (2013.01)

(58) Field of Classification Search
USPC ............ 235/462.01, 462.14, 462.25, 462.45, 235/472.01
See application file for complete search history.

(56) References Cited

U.S. PATENT DOCUMENTS

| | | | |
|---|---|---|---|
| 5,053,609 A | 10/1991 | Priddy et al. | |
| 5,378,883 A * | 1/1995 | Batterman | G06K 7/10881 235/455 |
| 2006/0098241 A1 | 5/2006 | Cheong et al. | |
| 2009/0057411 A1* | 3/2009 | Madej | G06K 7/10861 235/462.11 |
| 2015/0332079 A1* | 11/2015 | Park | G06K 7/1443 235/462.09 |
| 2016/0350569 A1* | 12/2016 | Gagliano | G06K 7/1417 |
| 2019/0108379 A1* | 4/2019 | Bachelder | G06K 7/1452 |
| 2019/0171853 A1* | 6/2019 | Gao | G06K 7/10712 |
| 2021/0125373 A1* | 4/2021 | Gauthier | G06K 7/1456 |

FOREIGN PATENT DOCUMENTS

| | | |
|---|---|---|
| EP | 2393035 A2 | 12/2011 |
| EP | 3428834 A1 | 1/2019 |

OTHER PUBLICATIONS

Search Report dated Feb. 6, 2020 issued in corresponding European Application No. 19195509.5.

* cited by examiner

*Primary Examiner* — Tuyen K Vo
(74) *Attorney, Agent, or Firm* — Nath, Goldberg & Meyer; Jerald L. Meyer

(57) ABSTRACT

A method for determining a module size of an optical code (20), wherein image data with the code (20) are detected, a brightness distribution is determined from the image data, and the module size is determined from the brightness distribution. The brightness distribution for example is a greyscale histogram.

17 Claims, 5 Drawing Sheets

DETERMINING A MODULE SIZE OF AN OPTICAL CODE

Figure 1:
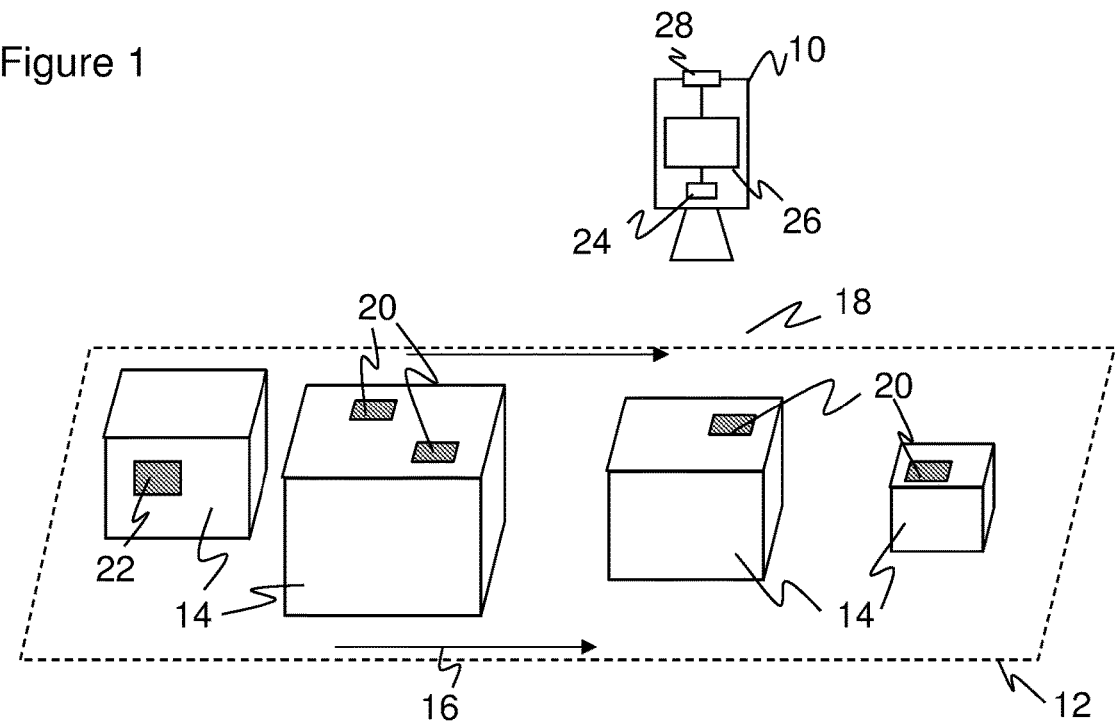

The invention relates to the determination of a module size of an optical code and a code reader.

Code readers are well known from supermarket checkouts, automatic parcel identification, sorting of mail, baggage handling in airports and other logistics applications. In a code scanner, a reading beam is guided across the code by a rotating mirror or a polygon mirror wheel. A camera-based code reader takes images of the objects with the codes using an image sensor, and image evaluation software extracts the code information from these images. Camera-based code readers can easily handle code types other than one-dimensional bar codes, which are also two-dimensional like a matrix code and provide more information.

In one group of applications, the objects with the codes are conveyed past the code reader. A code scanner detects the codes that are consecutively guided into its reading range. Alternatively, in a camera-based code reader, a line camera captures object images with the code information successively and line by line with the relative movement. A two-dimensional image sensor is used to detect image data that overlaps to a degree depending on the imaging frequency and the conveyor speed. In order that the objects can be arranged on the conveyor in any orientation, a plurality of code readers are often provided on a reading tunnel to detect objects from several or from all sides.

One characteristic of an optical code is the module size. A module is the smallest element of the code, and the code elements or characters are composed of one or more modules. The module size is a measure of the extent of the module and is expressed in pixels per module (ppm). Thus, a bar in a barcode has a width of the module size or a multiple of the module size, and this applies analogously to the two dimensions of a dark or light area in a two-dimensional code. A large module size means that the code is detected with high resolution in the image data or greyscale profiles. Consequently, the smaller the module size, the more challenging decoding becomes, especially if it reaches a range of two ppm or even less.

It would be advantageous if the decoder knew a good estimation from the beginning, in particular in case of small module sizes. In that case, measures could be taken to even read the poorly resolved code. One example is so-called superresolution. This refers to method that combines a plurality of lower-resolution images into one higher-resolution image. Conversely, it may be possible to refrain from using a complex decoding method for a code that anyway has been detected with a high resolution and large module size.

However, with conventional methods, the module size is only known after successful decoding. At that time, the characters contained in the code are known, and on that basis the module size can be calculated with great accuracy using the total size of the code in the image data. In the case of a barcode, for example, the characters are used to determine the total number of modules between the start and stop pattern, and the size of the code in pixels is divided by this total number. The module size thus is a result of decoding rather than assisting in the decoding.

In principle, the module size is nothing more than the smallest distance between two edges of the recorded greyscale profile. Such edges, i.e. transitions between the light and dark code elements, can be found by the extremes in the derivative of the greyscale profile. However, the result strongly depends on how precisely the edge positions are localized. This is particularly difficult with very small module sizes, since the edge positions initially are known only on a discrete level and therefore are not sub-pixel accurate. Furthermore, the edge positions are susceptible to noise. Even in principle, a purely edge-based method ultimately is a binarization, which reduces the original grey value information from typically eight or even more bits to only one bit, and this loss of information limits the possible accuracy of determining the module size.

It is also known in the field of code reading to generate a greyscale histogram of the image data. However, this is used for completely different purposes, for example to obtain or emulate a more uniform illumination or to determine a suitable binarization threshold.

It is therefore an object of the invention to provide an improved approach for determining the module size.

This object is satisfied by a method for determining a module size of an optical code, wherein image data with the code are detected, a brightness distribution is determined from the image data, and the module size is determined from the brightness distribution.

The object is also satisfied by a code reader for reading optical codes, comprising an image sensor for detecting image data with the code and a control and evaluation unit configured to read the code after determining a module size of the code, the module size being determined from a brightness distribution that is determined from the image data.

The optical code may be a barcode, but also a two-dimensional code according to one of the various known standards. Image data are generated which contain the code and are preferably at least roughly segmented and thus adapted to the code area. Image data are typically recorded with an image sensor of a camera-based code reader, but the intensity profile of a bar code scanner may also considered as being image data. An intensity or brightness distribution is generated from the image data. This is a function of the relative frequency of occurrence of the possible brightness values, in particular in a discrete form a greyscale histogram. The brightness distribution can thus be represented by arranging the possible brightness or intensity values on the X-axis, e.g. the grey values from 0 for black to 255 for white in an eight bit resolution, and the corresponding relative frequencies of occurrence on the Y-axis. In a greyscale histogram, the possible grey values form so-called bins counting the pixels with the corresponding brightness or greyscale value.

The invention starts from the basic idea of determining the module size from the brightness distribution. This is an indirect approach where no distances of the code or distances between edges in the code are measured. Rather, the fact is exploited that the module size has an effect on which grey values occur in the image data or how these grey values are distributed, in particular in the case of small module sizes, and this is investigated in the brightness distribution. The determination of a module size may be relatively rough and only test whether the module size is in a certain class. Preferably, however, an actual numerical value is derived.

The invention has the advantage that it enables a simple and fast calculation of the module size which can take place in very early stages of the image processing chain and in particular does not require prior successful decoding. High accuracy is achieved even in the sub-pixel range, for example for barcodes from 2.0 ppm down to 0.6 ppm and for two-dimensional codes from 2.5 ppm to 1.5 ppm. These are ppm ranges in which decoding is possible today, for example with superresolution methods. The method is also not based on positionally accurate, high-precision edge detection and uses area image information, not just local image information. It is therefore also much more robust against local interference or noise.

The module size preferably is determined from a central region of the brightness distribution. Throughout this specification, the terms preferably or preferred refer to advantageous, but completely optional features. The common expectation for the image data of a high-resolution code is that the brightness distribution should be bimodal having one a lateral peak for the brightest and a second lateral peak for the darkest code areas. Conventionally, this is used to binarize the image data, i.e. to classify each pixel as light or dark. In this embodiment, the brightness distribution is restricted to the transition area without the most clearly defined light and dark pixels. Thus, the focus is on the intermediate values which are conventionally ignored or just assigned to one of the two classes light or dark. For a high-resolution code with a large module size, this transition area is almost flat. The invention has recognized that, for small module sizes, there is an additional more or less frayed out peak in the transition area, and the module size can be reconstructed from the properties of that peak.

Edges of the optical code are preferably located in the image data, and the brightness distribution is formed only over image data in the neighborhood of edges. Instead of determining the brightness distribution from all pixels of the image data of the code, which is also possible in principle, there is a selection of certain pixels, namely in the area of edges. No particular positional accuracy or even subpixel localization of edges is necessary, since it causes at most moderate errors in the determination of the module size if a number of pixels from somewhat larger neighborhoods contribute to the brightness distribution. Thus, the edges can be localized as extremes of the derivative of a grey value profile, as mentioned in the introduction, and the pixels at these extremes and within a certain maximum distance can be used to determine the brightness distribution. With a restriction to neighborhoods of edges, larger just dark or light areas are not included in the brightness distribution, which would contribute little to the estimation of the module size according to the invention, as pointed out in the previous paragraph. Considering neighborhoods of edges eliminates the need to define thresholds between light/dark at the left and right of the brightness distribution and the relevant transition range of grey values in a middle range.

The brightness distribution preferably is tailored to an active area where the distribution exceeds a noise threshold. This eliminates regions of the brightness distribution which only pretend a certain frequency of occurrence of the corresponding grey values due to noise effects, but actually do not contain any information relevant for the determination of the module size. The following criteria and evaluations preferably refer to the active area rather than the entire brightness distribution, even where this is not specifically mentioned.

The module size preferably is determined from at least one of the width, the integral and the maximum value of the brightness distribution. These properties are used to determine the extent and characteristics of the brightness distribution, preferably of the transition area between light and dark, in quantities that are easy to determine and process. The width corresponds to the difference between the smallest and largest grey value that occurs in the brightness distribution. Integral and maximum value of the brightness distribution describe the course of the brightness distribution in a simple way. Preferably, width and integral are calculated from the active area of the brightness distribution above a noise threshold, so that values only marginally differing from zero do not distort the result. An estimate of the module size can be calculated from the above quantities. For example, useful results are already obtained with the assumption that, at least for small module sizes, the module size is linearly dependent on the width of the brightness distribution, in particular the width of the active area of the brightness distribution. With this approach, the width only needs to be multiplied by a scaling factor to determine the module size.

The module size preferably is determined from the quotient of the integral and the width of the brightness distribution. This is particularly easy to calculate and has also proved to be a very useful basis for calculating the module size.

The quotient preferably is mapped to the module size with a scaling function, in particular using units of pixels per module. The scaling function on the one hand is used to convert to the required unit ppm and on the other hand to adapt to the application conditions under which the code was detected. For example, it can be calibrated or taught-in from codes already read with a module size that is known or determined after decoding. In a simple embodiment, only a scaling factor is used as a scaling function, because this is sufficient for good results in the particularly interesting range of module sizes up to about 2.5 ppm.

The brightness distribution preferably is rescaled with different weighting factors at a center and at sides of the brightness distribution. For example, a weighting function is multiplied with the brightness distribution point by point, or a mathematically equivalent rescaling is carried out. As already mentioned, the left and right sides of the brightness distribution are due to bright and dark pixels areas of codes, while the module size is rather estimated from the grey values in the transition area in between. Therefore, it may be useful to artificially adjust the brightness distribution by weighting factors to give certain parts a higher or lower weight. If an integral of the brightness distribution is determined, rescaling preferably is done in advance.

The center of the brightness distribution preferably is raised relative to the sides. The brightness distribution thus is rescaled with a weight less than one at the sides and with a weight greater than one at the center. The effect of the central area of the brightness distribution is increased. In cases where the brightness distribution is already based on neighborhoods of edges only, the desired effect of not considering light and dark areas is reinforced by the new weighting.

The brightness distribution preferably is divided into three parts, namely a left side, a center and a right side, and wherein a weight factor for each of the three parts is used for rescaling. This is a specific and simple implementation to give the sides of the brightness distribution another weight than their center. Preferably, there is an even subdivision into three parts. The weighting factors for the right and left side are preferably the same.

The optical code preferably is read after determining the module size. Determining the module size is therefore an early step in image processing for reading the code and cannot rely on the results of decoding. Determining the module size after decoding would also be possible with very precise conventional alternative methods, as described in the introduction, which are not based on a brightness distribution.

The optical code preferably is at least one of read with a decoding method selected on the basis of the module size and parameterized by the module size. The module size thus is a parameter that already is available during decoding and possibly even for a fine segmentation of the code areas. Decoding is supported, simplified, accelerated, improved or made possible in the first place by knowing the module size in advance. One example is superresolution, i.e. the generation of higher resolution image data from several sets of lower resolution image data. The module size can be an indicator for codes that required superresolution. The module size also is a very helpful parameter for a superresolution algorithm. Another example is realizing the fact that decoding will not be possible at all because the module size is too small for the existing decoding methods. Currently, a practical limit for barcodes is 0.6 ppm. It saves resources to immediately classify the code as unreadable on the basis of the module size, instead of having to go to great lengths to make various complex decoding methods fail.

The determined module size preferably is compared with a limit value in order to use a decoding method or a component of a decoding method depending on whether the module size exceeds or falls below the limit value. This in a way is a discrete consideration according to that of the previous paragraph, where not the numerical value of the module size is used, but only a class of the module size is determined, similar to a switch, preferably one of the classes small module size and large module size. The limit value preferably is in a range of a module size of one to three pixels per module, or preferably between 1.5 and 2.5 pixels per module. A preferred limit value is 2 ppm for barcodes and 2.5 ppm for two-dimensional codes. For example, a superresolution algorithm is used for small module sizes. Moreover, it is common practice to have several decoders attempt to read a code, and the composition of respective decoders can be made entirely or partially dependent on whether or not the module size exceeds the limit value. It is conceivable that not entire decoding methods, but only certain modules are affected, which are parameterized differently or are involved or not involved depending on the module size being below or above the limit value.

The code reader according to the invention comprises an image sensor for detecting image data with the code. This can be the light receiver of a code scanner, a line sensor for detecting a line of code or an area code image by assembling image lines, or a matrix sensor. A plurality of camera heads whose images are combined is also conceivable. A decoding method for reading the code is implemented in a control and evaluation unit, which can be part of a bar code scanner or a camera-based code reader or be connected as a control device. During decoding, preferably as an early step prior to the actual reading, the control and evaluation unit determines the module size using an embodiment of the method according to the invention.

The part of the control and evaluation unit that is responsible for determining the module size can be configured as an embedded system. It is also conceivable to have an FPGA (Field Programmable Gate Array) at the image sensor, for example in a camera head, which analyses the detected image as a very early processing step with the method according to the invention in order to determine the module size. This would even be possible if the camera only captured a tile, i.e. a partial area of the reading field containing only a code fragment that in itself could not be read. Only after stitching the tiles of several camera heads or several successively captured images is decoding carried out, and at this point the module size is already known and can, for example, already be used during stitching.

Figure 2:
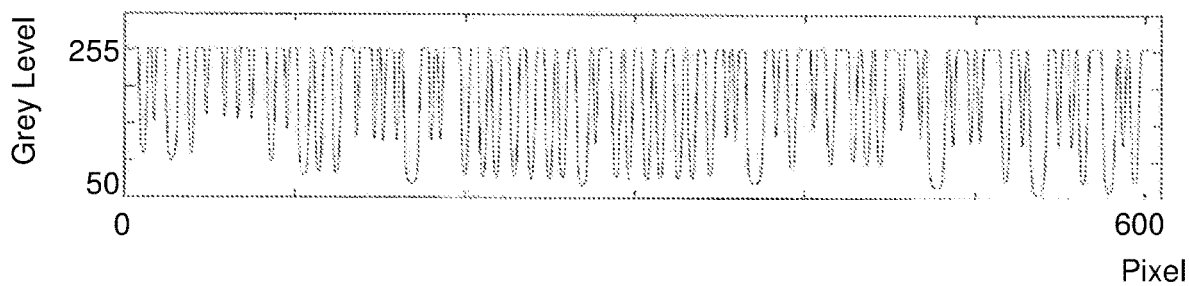
Figure 3:
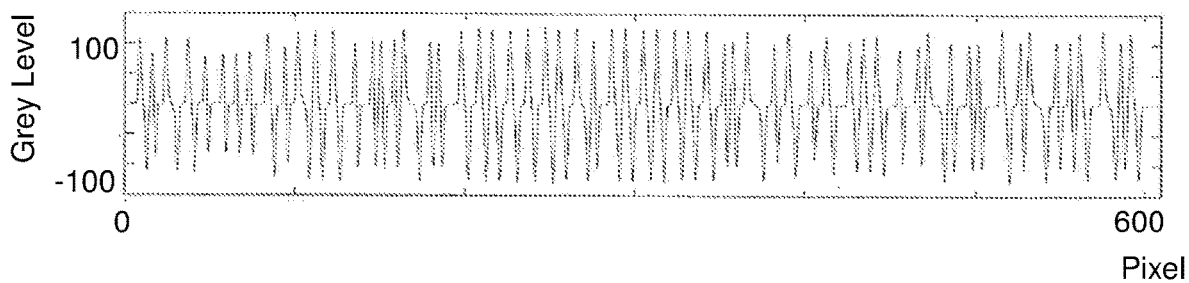
Figure 4:
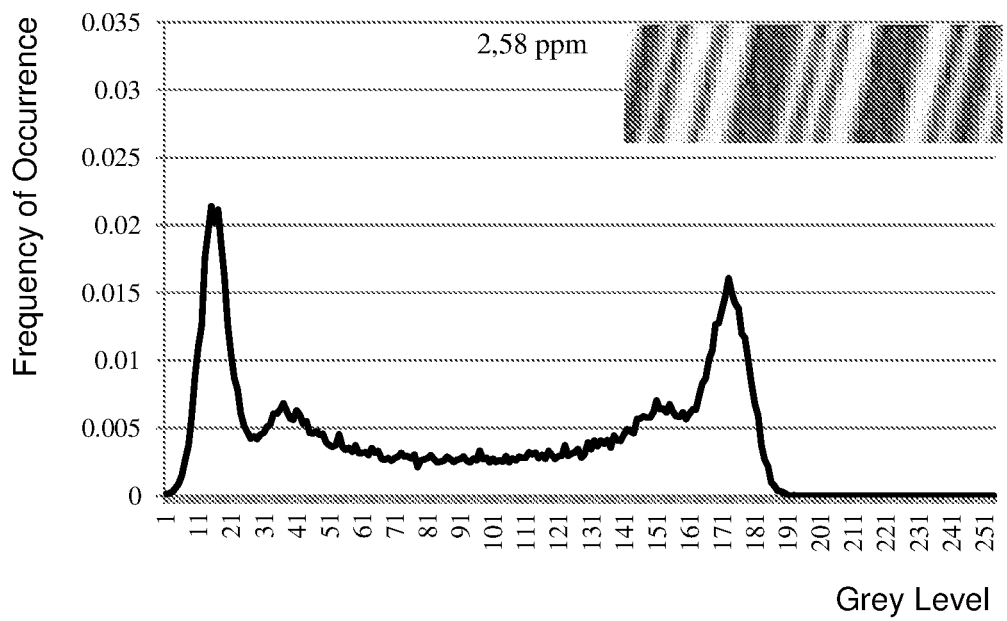
Figure 5:
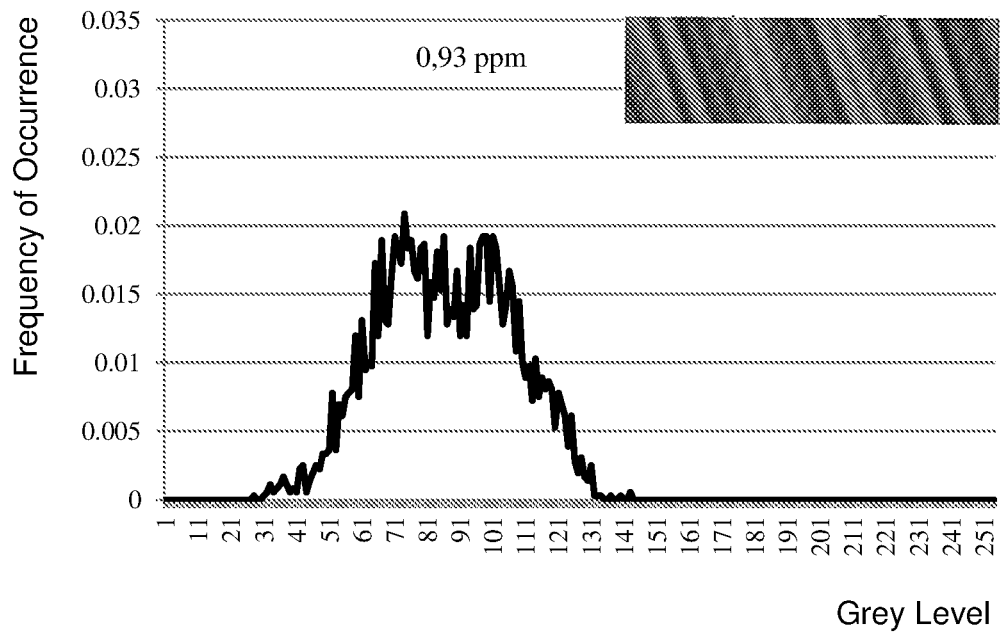
Figure 6:
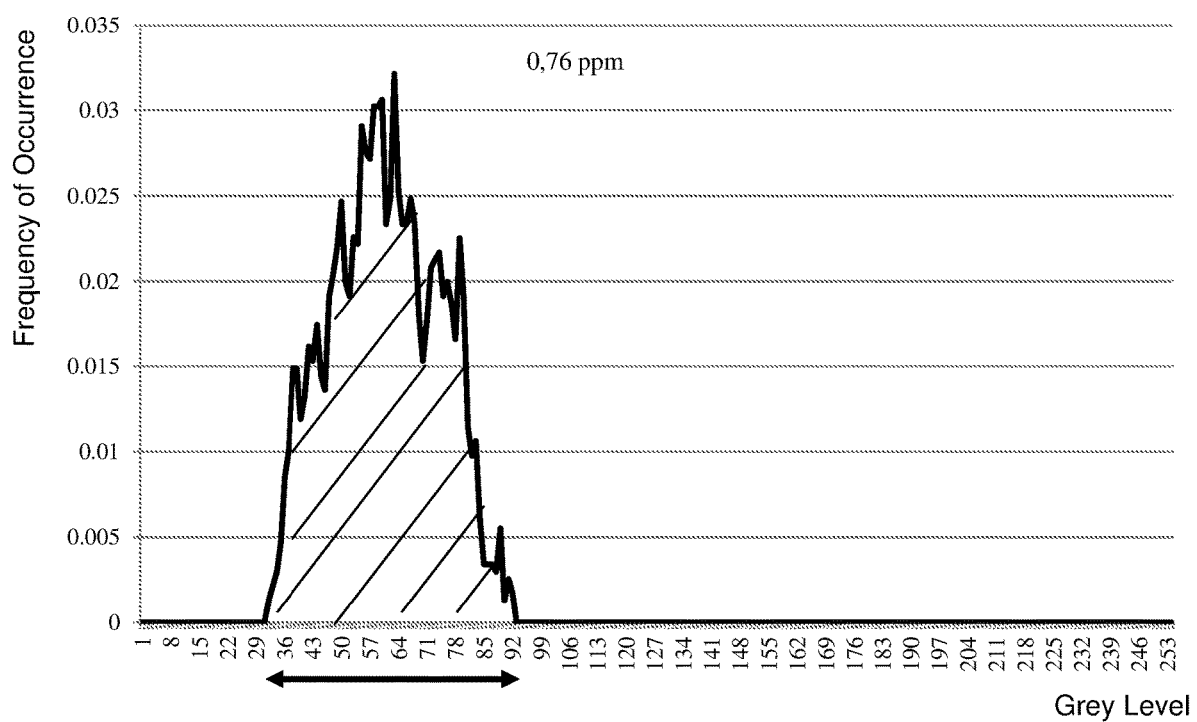
Figure 7:
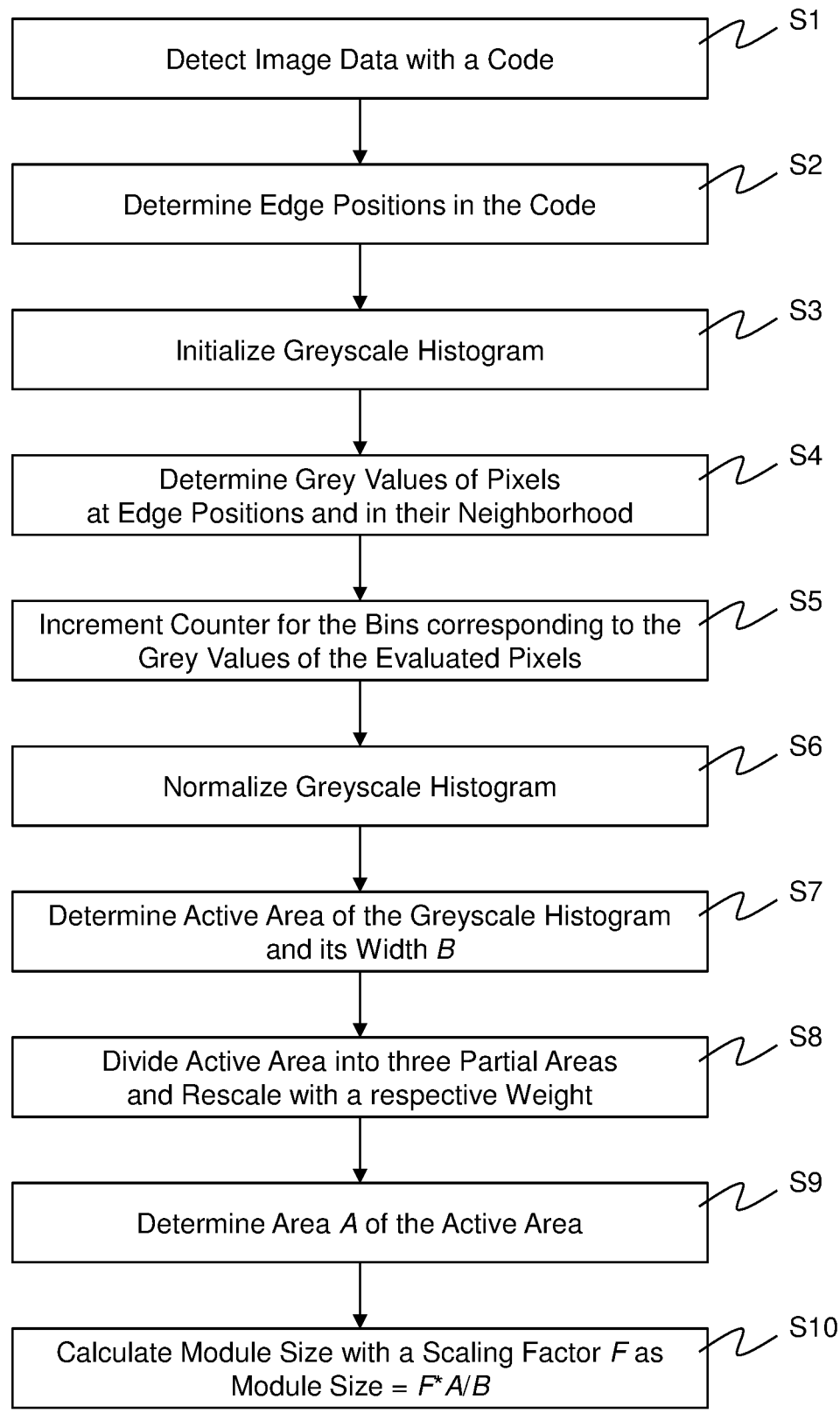
Figure 8A:
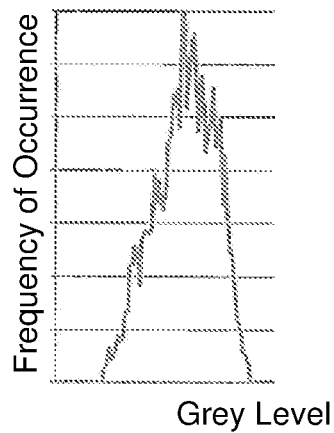
Figure 8B:
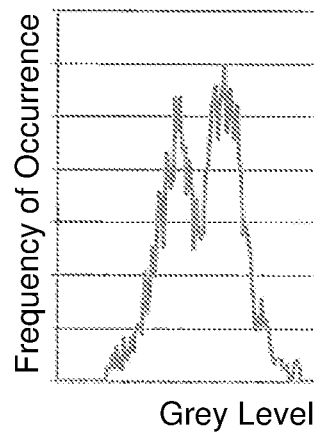
Figure 8C:
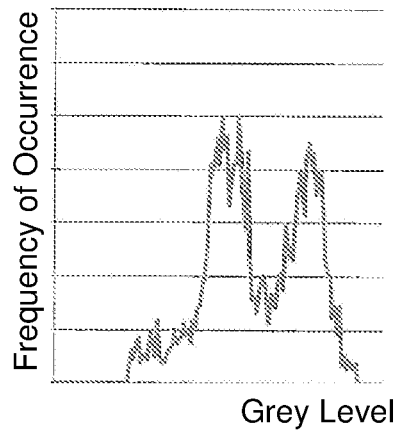
Figure 8D:
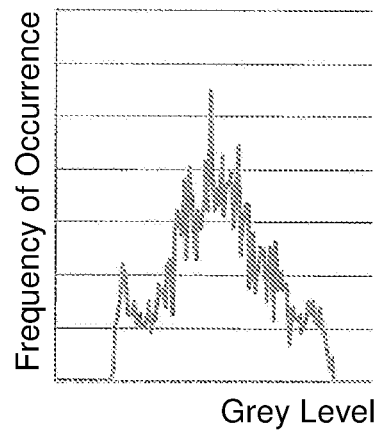
Figure 8E:
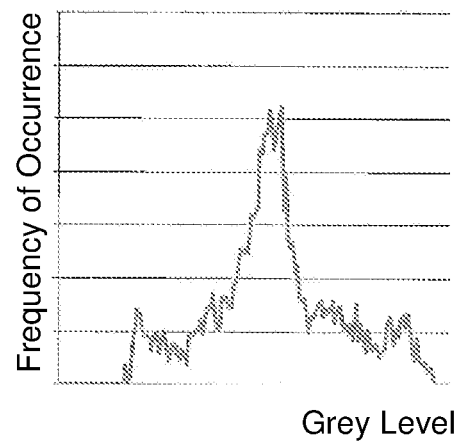

The invention will be explained in more detail in the following also with respect to further features and advantages by way of example with reference to embodiments and to the enclosed drawing. The Figures of the drawing show in:

FIG. 1 a schematic three-dimensional overview of the exemplary installation of a code reader above a conveyor belt where objects with codes to be read are conveyed;

FIG. 2 an example of a greyscale profile;

FIG. 3 a representation of the derivative of the greyscale profile according to FIG. 2 for locating edges;

FIG. 4 an example of a greyscale histogram of a code with large module size;

FIG. 5 an example of a greyscale histogram of a code with small module size;

FIG. 6 a representation of the active area of a greyscale histogram above a noise threshold, illustrating the integral and width of the active area;

FIG. 7 a flowchart for an exemplary algorithm for determining the module size from a greyscale histogram; and FIG. 8*a-e* exemplary representations of greyscale histograms for different module sizes.

FIG. 1 shows an optoelectronic code reader 10 in a preferred application situation mounted above a conveyor belt 12 that conveys objects 14, as indicated by the arrow 16, through the detection area 18 of the code reader 10. The objects 14 have code areas 20 on their outer surfaces that are detected and evaluated by the code reader 10. The code areas 20 can only be detected by the code reader 10 if they are arranged on the top or at least visible from above. For this reason, in deviation from the illustration in FIG. 1, a number of code readers 10 can be mounted from different directions to read a code 22 that is arranged at a side or bottom, in order to enable so-called omni-reading from all directions. A plurality of code readers 10 in practice are preferably arranged as a reading tunnel. The stationary application of the code reader 10 at a conveyor belt 12 is very common. However, the invention primarily relates to the code reader 10 itself and its implemented method for decoding codes, or more specifically a preprocessing step to that end, and therefore this example is not to be understood in a restrictive manner.

The code reader 10 uses an image sensor 24 to detect image data of the conveyed objects 14 and the code areas 20, which are further processed by a control and evaluation unit 26 using image evaluation and decoding methods. The specific imaging method is not important for the invention, so that the code reader 10 can be configured according to any known principle. For example, only one line is detected at any one time, either by means of a line-shaped image sensor or a scanning method, where in the latter case a simple light receiver such as a photodiode is sufficient as image sensor 24. An image line can directly be used for an attempt to read the code, or the control and evaluation unit 26 combines the lines detected during the conveyor movement to form the image data. With a matrix-shaped image sensor, a larger area can be captured in one image, where it is also possible to combine images both in the conveying direction and the transverse direction. The plurality of images may be taken one after the other and/or by a plurality of code readers 10 that for example cover the entire width of the conveyor belt 12 only with their combined detection areas 18, each code reader 10 detecting only one tile of the entire image and the tiles being combined by image processing (stitching). It is also conceivable to decode only fragments within individual tiles and then to stitch the code fragments.

The main task of the code reader 10 is to detect the code areas 20 and to read the codes therein. As a sub-step, preferably as early as possible in the processing chain and prior to the actual code reading, the module size is determined from a brightness distribution or a greyscale histogram of the images of the respective code 20. This is explained in detail below with reference to FIGS. 2 to 8.

The code reader 10 provides information, such as read codes or image data, via interface 28. It is also conceivable that the control and evaluation unit 26 is not arranged in the code reader 10 itself, i.e. the camera shown in FIG. 1, but is connected as a separate control device to one or more code readers 10. In this case, interface 28 also is used as a connection between internal and external control and evaluation. The control and evaluation functionality can be distributed to internal and external modules in practically any way, while the external modules can also be connected via network or cloud. No further distinction is made in this regard, and the control and evaluation unit 26 is considered as part of the code reader 10, regardless of the actual implementation.

FIG. 2 shows an example of image data of a code 20 in the form of a greyscale or grey level profile of an image line through the code 20. This kind of greyscale profile forms the initial data obtained by image sensor 24. The example of a greyscale profile is not a real limitation. Optical codes consist of areas in two modalities, often black and white color, sometimes structures or embossing, but in any case the code information can be captured by greyscale images. It does also not matter for the understanding of the invention whether the greyscale profile is detected as a scan of a bar code scanner, an image line of a line-shaped image sensor or a line through a two-dimensional image of the code 20.

The further specification is based on the example of barcodes, but the method according to the invention for determining the module size is analogous for two-dimensional codes. In the case of a barcode, the greyscale profile should not be captured almost parallel to the bars. If the module size is to be determined in absolute length units, the angle of the greyscale profile with respect to the code must be known. However, the size of interest for decoding is how many pixels represent a module (ppm, pixel per module), in the very same image data that the decoder receives, including a possible skew in the code 20.

In principle, the desired module size is already represented in FIG. 2. The respective plateaus at high and low grey values correspond to the characters of the code, so that the widths of the plateaus could be measured and the module size could be fitted as the smallest length from which the widths could be reconstructed by this smallest length or multiples thereof. However, the error is too large by far, in particular in view of lots of the plateaus not even being recognizable as plateaus, let alone allowing for reliable measurement of their width.

FIG. 3 shows the derivative of the greyscale profile according to FIG. 2. The edges of the code, i.e. the transitions between light and dark code elements and vice versa, are the extrema. Instead of the plateaus as in FIG. 2, the distances between adjacent extrema could thus be used to determine the module size, as already discussed in the introduction. The problem is that the edge positions are noisy and even without noise at best allow a determination of the module size with an accuracy of one pixel, but no subpixel accuracy. However, edge positions that are only roughly determined with these limitations can still be useful for the method according to the invention for determining the module size.

According to the invention, the module size is not determined from greyscale profiles or derivatives thereof, but an indirect approach via a histogram of greyscale values or, more generally, a brightness distribution is used.

FIG. 4 shows an exemplary greyscale histogram for a barcode that was recorded with a good resolution and a module size of 2.58 ppm. The small inset picture on the top right shows a real image section for illustration. The greyscale histogram is created by arranging the possible greyscale values, in this case 0-255 corresponding to 8-bit image data, as bins on the X axis. For each pixel of the code image data under consideration, the bin corresponding to the grey value of the pixel is incremented by one. The code's quiet zones preferably are not included in the greyscale histogram. As a final step, there can be a normalization by dividing by the total number of contributing pixels, which ensures that the sum of all bins equals one. The greyscale histogram is a discretization of the brightness distribution, and therefore the more general term brightness distribution is also used in this specification.

For sufficient module size, the greyscale histogram is bimodal with a clear left and right peak for the dark and light code elements, respectively, and a flat area in between.

FIG. 5 shows another exemplary greyscale histogram now recorded for a barcode that was recorded with a poor resolution and a module size of 0.93 ppm. Again, the small inset picture on the top right shows a real image section for illustration, which gives an idea why reading such a code requires special attention. The greyscale histogram differs significantly from that of a code recorded with a good resolution and a module size of at least 2 ppm. The bimodality increasingly gets lost with decreasing module size. With increasing blurring due to poor resolution, an increasingly strong peak is formed at medium grey values.

This illustrates the basic idea of the invention: The brightness distribution, which is obtained in particular as a greyscale histogram, allows conclusions to be drawn about the module size. This may be a qualitative statement as to whether the module size is large or small, with the limit in between for example being 2 ppm, but it is also possible to estimate a numerical value for the module size. FIGS. 4 and 5 again show barcodes as examples. The blurring effects caused by too low a resolution, from which the module size is ultimately determined according to the invention, also occur with two-dimensional codes, so that the example of barcodes must not be understood as restricting.

As explained with reference to FIGS. 4 and 5, the difference between small and large module sizes is reflected in the different characteristics of the peak for medium grey values. The distinguishability of module sizes is therefore increased if the central or transition region of the greyscale histogram is considered.

It is therefore advantageous if the greyscale histogram is obtained only from pixels that correspond to this transition area. This can be achieved in that the greyscale histogram is not formed from all pixels of an image of a code, but only from pixels in the neighborhood of edges. There at the edges, the blurring effect due to under-sampling or too low resolution can be measured particularly well.

It has already been explained with reference to FIG. 3 how the edge positions can be estimated, for example from a derivative of a greyscale profile. The greyscale histogram preferably is formed from the pixels at these edge positions and a respective pixel neighborhood. For the purpose of restricting a grey scale histogram to edge neighborhoods it is not important that the edge positions are only accurate to one pixel, since the subpixel range is anyway not considered in the greyscale histogram. Any edge position errors caused by noise effects are also tolerated, as they only lead to a pixel being wrongly included or excluded every now and then. In any case, this is much better than including all pixels indiscriminately.

An exemplary greyscale histogram based on edge neighborhoods is shown in FIG. 6. It should be noted, however, that although considering a greyscale histogram consisting only of pixels in a neighborhood of edges is particularly advantageous and allows a particularly good accuracy in determining the module size, the module size nevertheless can also be estimated from simple greyscale histograms that take into account all pixels of an image of a code or code area.

In order to determine a module size from the greyscale histogram based on edge neighborhoods, or alternatively a complete greyscale histogram, the greyscale histogram may be described by characteristic variables. Only an active area of the greyscale histogram preferably is considered to ensure that individual noise events do not affect the evaluation. This includes only those bins that exceed a noise threshold, for example either specified as a minimum number of pixels contributing to the bin or a minimum percentage.

It turns out that the width, as illustrated by an arrow in FIG. 6, is a very useful characteristic variable. The width is the difference between the largest and smallest grey value occurring in the greyscale histogram. Another characteristic variable useful for calculating the module size is the area or integral of the greyscale histogram, which can be obtained by summing up the bins.

The area of a normalized histogram of course is one, so the integral only makes a real contribution if the greyscale histogram is not normalized or is normalized before the active area is determined with the noise threshold, or if subareas are rescaled as explained below. Other possible characteristic variables are the height of the main maximum, the number of secondary maxima or the ratio of the height of the main maximum to the height of the first secondary maximum.

One possible specific calculation for the module size is to form the quotient of integral and width and to map this measured value with a scaling factor to a module size in units of ppm. The scaling factor can for example be obtained by reading codes in a calibration or teach-in process and subsequently determining the module sizes with high accuracy by common means. Then, in reversal of the later calculation, the known module size is compared with the quotient of integral and width to find the required scaling factor.

FIG. 7 shows a flowchart for an exemplary algorithm for determining the module size from a greyscale histogram. In this algorithm, some specific steps are provided, which are to be understood as advantageous embodiments and do not limit the generality of the specification.

In a step S1, input data is obtained, i.e. the image data of the code, for example in the form of one or more greyscale profiles, as explained above with reference to FIG. 2.

In a step S2, the edge positions in the code are determined. The derivative of greyscale profiles can be used to that end, as explained above with reference to FIG. 3. An accuracy of pixels rather than sub pixels as well as possible position errors due to noise are no obstacle for the estimation of the module size.

In a step S3, the greyscale histogram is initialized by providing bins according to the possible grey values and initializing the respective bin counters with zero.

In a step S4, the grey values of the pixels at the edge positions as well as in their neighborhood are determined, for example the preceding i and the following j pixels.

In a step S5, the bins associated with the grey values determined in step S4 are incremented accordingly. Steps S4 and S5 are separated for explanation only. In practice, rather all edge positions and, for each edge position, the pixels in their neighborhood would be considered one after the other, and for each relevant pixel the bin of the corresponding grey value would be incremented. As an alternative to the edge-based greyscale histogram according to steps S2, S4 and S5, a greyscale histogram can also be formed from all pixels of the input data of step S1, in which case the estimation of the module size may become less accurate.

In a step S6, the greyscale histogram is normalized so that the sum over all bins is one. The normalization factor corresponds to the number of pixels contributing to the greyscale histogram or the sum over the greyscale histogram prior to normalization. The normalization is completely optional and could in particular also be replaced by using the scaling factor F to be introduced in step S10.

In a step S7, the greyscale histogram is limited to a so-called active area by only considering bins that have a minimum count or frequency of occurrence exceeding a noise threshold. The noise threshold can be a constant or a fraction of the sum of all bins of frequencies of occurrence, for example a per mille value, and eliminates outliers. A width B is calculated as the difference between the largest and smallest bin of the active area.

A subsequent step S8 is completely optional and is an example of an optional rescaling of the greyscale histogram that can be used to further enhance certain characteristic properties for determining the module size. In this specific example implementation, the active area is divided into three equally sized partial areas. The bins in the left and right part are multiplied by a side weight, the bins in the central part are multiplied by a central weight. Alternatively, a more finely resolved weighting function could be used. Preferably, the rescaling is used for a relative weakening of the side areas and a relative strengthening of the central area, whatever the specific design of the rescaling. This is because, as explained with reference to FIG. 5, the central transition area of grey values is of particular interest for determining the module size, and is thus emphasized still more.

In a step S9, the bins of the active area are summed up so that an integral or the area A of the active area is determined.

In a step S10, the quotient of area A and width B is formed. This already is the desired estimation of the module size, but still in the wrong units. Therefore, the module size is calculated as F*A/B, i.e. a scaling factor F is introduced, which scales the measured variables from the greyscale histogram to a module size in units of ppm. The scaling factor F can be empirically determined or taught-in in advance.

FIGS. 8*a-e* show examples of grey scale histograms for different module sizes, each limited to the neighborhood of edges as explained with reference to FIG. 6. The respective actual module sizes were reconstructed with only a small error using the method explained with reference to FIG. 7. Specifically, in FIG. 8*a* the actual module size is 0.8 ppm and the estimated module size is 0.79 ppm, in FIG. 8*b* the actual module size is 1.0 ppm and the estimated module size is 1.06 ppm, in FIG. 8*c* the actual module size is 1.2 ppm and the estimated module size is 1.23 ppm, in FIG. 8*d* the actual module size is 1.4 ppm and the estimated module size is 1.19 ppm, and in FIG. 8*e* the actual module size is 1.5 ppm and the estimated module size is 1.68 ppm.

In a data set of more than 700 code images taken from a real application, an average error of 0.15 of the estimated module size could be achieved. The calculations become less accurate for increasing module sizes. A major reason is that the scaling factor F is actually a scaling function that should be attenuated for increasing module sizes, for example of greater than 2 ppm. In principle, a scaling function can be determined empirically or taught-in in the same way as a scaling factor. In practice, however, this is not really necessary, since the small module sizes, where a constant scaling factor F results in a good estimation, are the more critical cases by far, and an estimation error for increasing module sizes can therefore usually be accepted.

The invention claimed is:

1. A method for determining a module size of an optical code (20), comprising the steps of:
    detecting image data of the code (20);
    determining a brightness distribution from the image data; and
    determining the module size from the brightness distribution by determining a parameter associated with the brightness distribution and calculating the module size as a function of the parameter, wherein the parameter is selected from the group consisting of a width of the brightness distribution, an integral of the brightness distribution, a maximum value of the brightness distribution, a quotient of the integral of the brightness distribution and the width of the brightness distribution, and combinations thereof.

2. The method according to claim 1,
    wherein the brightness distribution is a greyscale histogram.

3. The method according to claim 1,
    wherein the step of determining the module size comprises determining the module size from a central region of the brightness distribution.

4. The method according to claim 1,
    wherein edges of the optical code (20) are located in the image data and the brightness distribution is formed only over image data in a neighborhood of edges.

5. The method according to claim 1,
    further comprising the step of limiting the brightness distribution to an active area where the brightness distribution exceeds a noise threshold.

6. The method according to claim 1,
    wherein the parameter associated with the brightness distribution comprises the quotient of the integral of the brightness distribution and the width of the brightness distribution.

7. The method according to claim 6,
    wherein the function of the parameter comprises mapping the quotient to the module size with a scaling function.

8. The method according to claim 7,
    wherein the step of mapping the quotient to the module size comprises mapping the quotient to the module size using units of pixels per module.

9. The method according to claim 1,
    further comprising the step of rescaling the brightness distribution with different weighting factors at each of a center of the brightness distribution and at sides of the brightness distribution.

10. The method according to claim 9,
    wherein the center of the brightness distribution is raised relative to the sides of the brightness distribution.

11. The method according to claim 1,
    further comprising the step of rescaling the brightness distribution with respective weighting factors at each of a left side of the brightness distribution, a center of the brightness distribution, and a right side of the brightness distribution.

12. The method according to claim 1,
    further comprising the step of reading the optical code (20) following the step of determining the module size.

13. The method according to claim 12,
    wherein the optical code (20) is at least one of read with a decoding method selected on the basis of the module size and parameterized by the module size.

14. The method according to claim 1,
    further comprising the step of comparing the determined module size with a limit value in order to use a decoding method or a component of a decoding method, dependent on whether the module size exceeds or falls below the limit value.

15. The method according to claim 14,
    wherein the limit value is in a range of a module size of one to three pixels per module.

16. A code reader (10) for reading optical codes (20), comprising:
    an image sensor (24) for detecting image data with the code (20); and
    a control and evaluation unit (26) configured to read the code (20) after determining a module size of the code (20), the module size being determined from a brightness distribution that is determined from the image data,
    wherein the control and evaluation unit (26) is further configured to determine a parameter associated with the brightness distribution and calculate the module size as a function of the parameter, wherein the parameter is selected from the group consisting of a width of the brightness distribution, an integral of the brightness distribution, a maximum value of the brightness distribution, a quotient of the integral of the brightness distribution and the width of the brightness distribution, and combinations thereof.

17. The code reader (10) according to claim 16,
    wherein the brightness distribution is a greyscale histogram.

* * * * *